United States Patent [19]

Lemelson

[11] Patent Number: 4,605,080

[45] Date of Patent: Aug. 12, 1986

[54] SPEECH RECOGNITION CONTROL SYSTEM AND METHOD

[76] Inventor: Jerome H. Lemelson, 48 Parkside Dr., Princeton, N.J. 08540

[21] Appl. No.: 715,624

[22] Filed: Mar. 25, 1985

Related U.S. Application Data

[63] Continuation-in-part of Ser. No. 401,116, Jul. 23, 1982, Pat. No. 4,544,929, which is a continuation of Ser. No. 167,673, Jul. 11, 1980, Pat. No. 4,342,038.

[51] Int. Cl.⁴ .............. G01G 23/38; G01G 23/22; G01G 19/00; G01D 9/00
[52] U.S. Cl. ........................... 177/4; 177/25; 177/245; 346/9; 364/567
[58] Field of Search .............. 177/25, 4, 245; 364/567; 346/9

[56]        References Cited
       U.S. PATENT DOCUMENTS

| 4,366,873 | 1/1983 | Levy et al. ................ 177/45 X |
| 4,386,994 | 6/1983 | Fujii et al. ................ 177/25 X |
| 4,423,792 | 1/1984 | Cowan ...................... 177/245 X |
| 4,465,151 | 8/1984 | Gorman et al. ............. 177/25 X |
| 4,506,330 | 3/1985 | Dlugos ...................... 364/567 X |

Primary Examiner—George H. Miller, Jr.

[57] ABSTRACT

A weighing scale involving calculating functions is provided with an automatic control system that can accept words of speech spoken into a microphone as inputs to the automatic control system.

20 Claims, 5 Drawing Figures

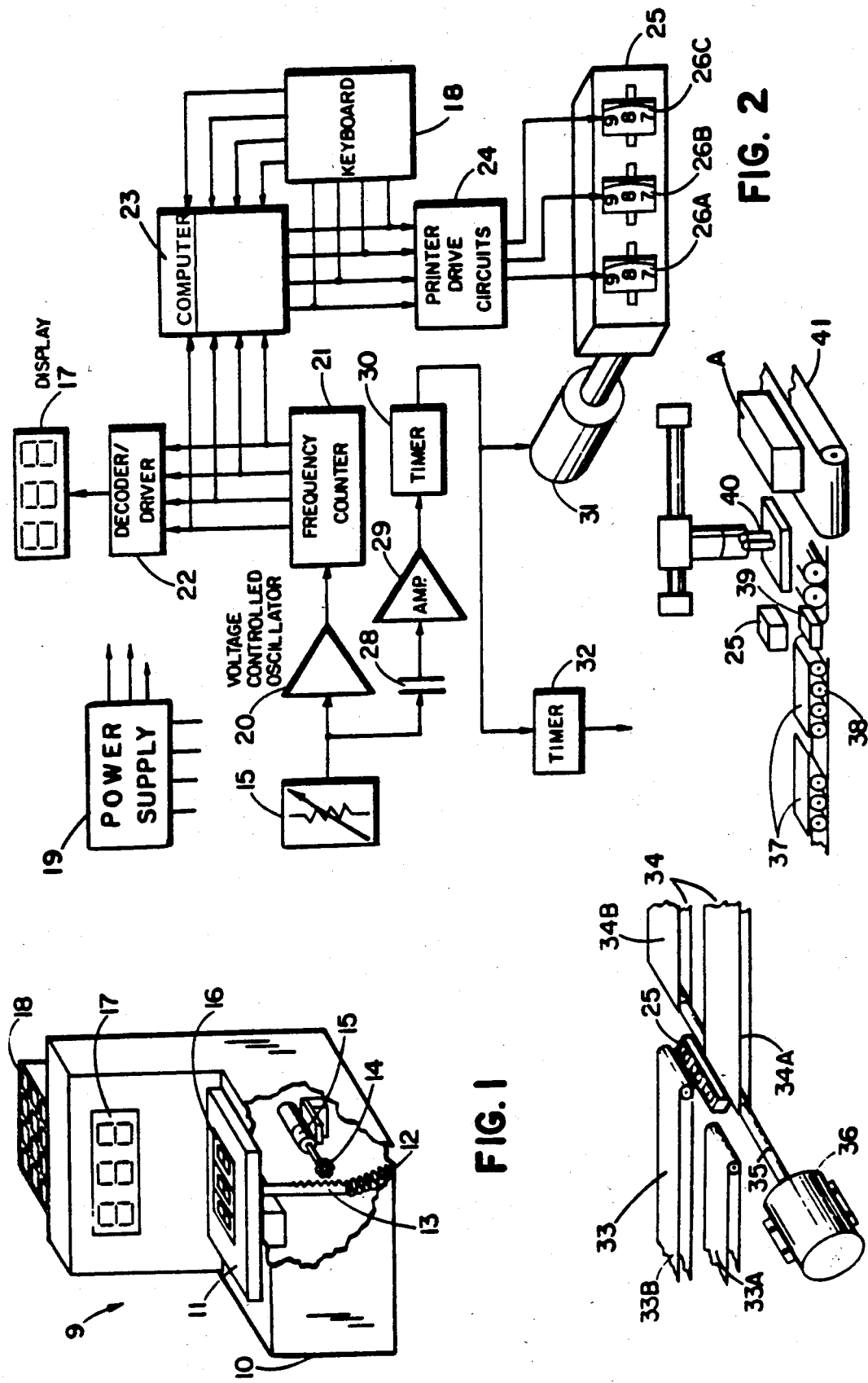

SPEECH RECOGNITION CONTROL SYSTEM AND METHOD

CROSS REFERENCE TO RELATED APPLICATIONS

This is a continuation-in-part of application Ser. No. 401,116 filed July 23, 1982 now U.S. Pat. No. 4,544,929 for Weighing Apparatus and Method, a continuation of Ser. No. 167,673 filed July 11, 1980, now U.S. Pat. No. 4,342,038.

BACKGROUND OF THE INVENTION

1. Field of the Invention

The invention is in the field of automatic control systems which are programmed or preset in accordance with select words of speech spoken into a microphone when the audio signals output by the microphone and computer processed and recognized. In particular, the invention concerns such an automatic control system for use in effecting calculating functions relating to automatic weighing and the printing or display of weight and other variable associated with the weight and marking of articles.

2. Description of the Prior Art

The prior art involves controlling a weighing and calculating function, such as the computation of selling price, postage or the like by manually operating a keyboard prior to weighing an article.

SUMMARY OF THE INVENTION

This invention relates to a system and method for weighing articles and quantities of material wherein computing functions are performed to effect calculations and the control of a visual presentation means such as a display or printer or the generation of signals for use in recording a transaction. In particular, the invention relates to such a weighing and computing apparatus and method which operates or varies in response to speech signals generated by selected words of speech spoken into a microphone by an operator of the apparatus.

It is known in the art to electronically detect the weight of articles and containers of material and to generate electrical signals which are indicative of such weight. It is also known to effect a computation with respect to such signals and additional signals generated by manually operating selected keys of a keyboard wherein the additional signals represent one or more additional variables which must be divided into or multiplied by the numerical representations of the weights of articles weighed by such apparatus.

The instant invention involves a number of improvements in function and operation of such a weighing and computing system resulting from the employment of electronic speech recognition means connected to receive sounds of selected words of speech spoken into a microphone which is preferably located at or immediately adjacent a measuring station or scale. Commands such as "weight", "repeat weigh", [numbers relating to a variable]", "reject load", "print weight", "print postage", "print code", "Print label and apply", etc. In a preferred embodiment, the instant invention involves the verbal generation of signals representative of numbers or a number, such as price per pound, postal zone, etc. which number is to be multiplied by the number defining the weight which is measured or indicated of the article or container disposed on the scale so as to provide signals for controlling a printing device for printing proper postage or an indication of cost either on a label to be affixed to the article weighed or to be printed directly against the article while it is disposed on the weighing element or platform or immediately after it travels therefrom. As a result, the time required to effect weighing and completion of transactions with respect to articles weighed and the labor required for such functions are greatly reduced as are human errors in the operation of weighing and completing such transactions.

Accordingly it is a primary object of this invention to provide a new and improved apparatus and method for weighing articles and containers.

Another object is to provide an improved apparatus and method for weighing and preparing articles and containers for such transactions as pricing and the application of postage thereto.

Another object is to provide a method for simplifying the application of proper postage and price information to articles and containers.

Another object is to provide a system and method for controlling the operation of a weighing apparatus by means of speaking selected words of speech into a microphone.

Another object is to provide a system and method for reducing the amount of time required to effect a transaction with respect to postal articles.

Another object is to provide a system and method for reducing the amount of time required to effect the transaction of calculating the cost of produce and other materials or packages in their containers such as a box or bag.

Another object is to provide a system and method for effecting an accounting of produce and other material which is dispensed from storage, in response to speaking selected words into a microphone.

Another object is to provide a system and method for weighing articles, marking the weighed articles with indications of their weight and recording the transaction in the memory of a computer so as to automatically effect both weighing and inventory taking.

Another object is to provide a record keeping system for articles and materials dispensed from storage wherein a record of the weight of such articles and/or their selling price is effected in a manner such that the recordings thereof may be employed for auditing purposes.

Another object is to provide an improved weighing apparatus and method wherein a product or container weighing operation is controlled by an electronic computer which computer may be programmed or data entered therein for computing purposes with respect to the weight made by speaking a select word or words into a microphone.

Another object is to provide a computer controlled weighing apparatus and method which includes a means for displaying information other than weight but which varies in accordance with changes in the weight detected, wherein the programming or data entry to determine the variable to take part in the computation is effected at least in part speaking one or more select words into a microphone and computer processing and recognizing the speech signals output by such microphone.

Another object is provide a computer controlled weighing and price calculating apparatus together with a speech recognition system for controlling same wherein both weight dependant calculations and speech recognition functions are performed by computing electrical circuits provided on a single chip or substrate.

Another object is to provide a system and method for weighing articles, calcualting cost thereof, identifying such articles by printing data thereon derived by such calculating and from a memory, and remotely recording the weighing and calculating functions for recording keeping and inventory purposes.

Another object is to provide a weighing system which is particularly useful in weighing and pricing a variety of consumer products, such as produce, wherein the price thereof varies with weight and the particular product weighed and a human being is employed to detect and indicate to the operators the identification of the product weighed.

Another object is to provide a weighing apparatus and method for weighing and marking products with cost information wherein a human being interfaces with the system for weighing and computing cost.

Another object is to provide a system and method for computing cost information, such as useful in pricing products and computing postage, wherein at least one variable is input to a computer by means of speaking one or more selected words of speech into a microphone.

Another object is to provide a system and method for controlling a data printer to print selected information on an article, record member or product.

Another object is to provide a system and method for rapidly applying data such as postage or price and additional data on an article or mailpiece.

Another object to provide a system and method for applying bar code data to articles and mail pieces.

With the above and such other objects in view as may hereinafter more fully appear, the invention consists of the novel constructions, combinations and arrangements of parts and methods for effecting the automatic weighing and calculating of mail or cost information and other data and its application to mailpieces and products or product containers, but it is to be understood that variations and modifications may be resoreted to which fall within the invention as claimed.

IN THE DRAWINGS

FIG. 1 is an isometric view, with parts broken away for clarity, of a weighing scale which contains or supports means for applying a code or alpha-numeric characters to a surface of an article being weighed on the platform thereof.

FIG. 3 is an isometric view of an automatic weighing and printing arrangement associated with a conveyor or conveyors of articles, and FIG. 4 is an isometric view of a modified form of the apparatus illustrated in FIG. 1 for applying printed labels to articles on the conveyor.

Figure 2A:
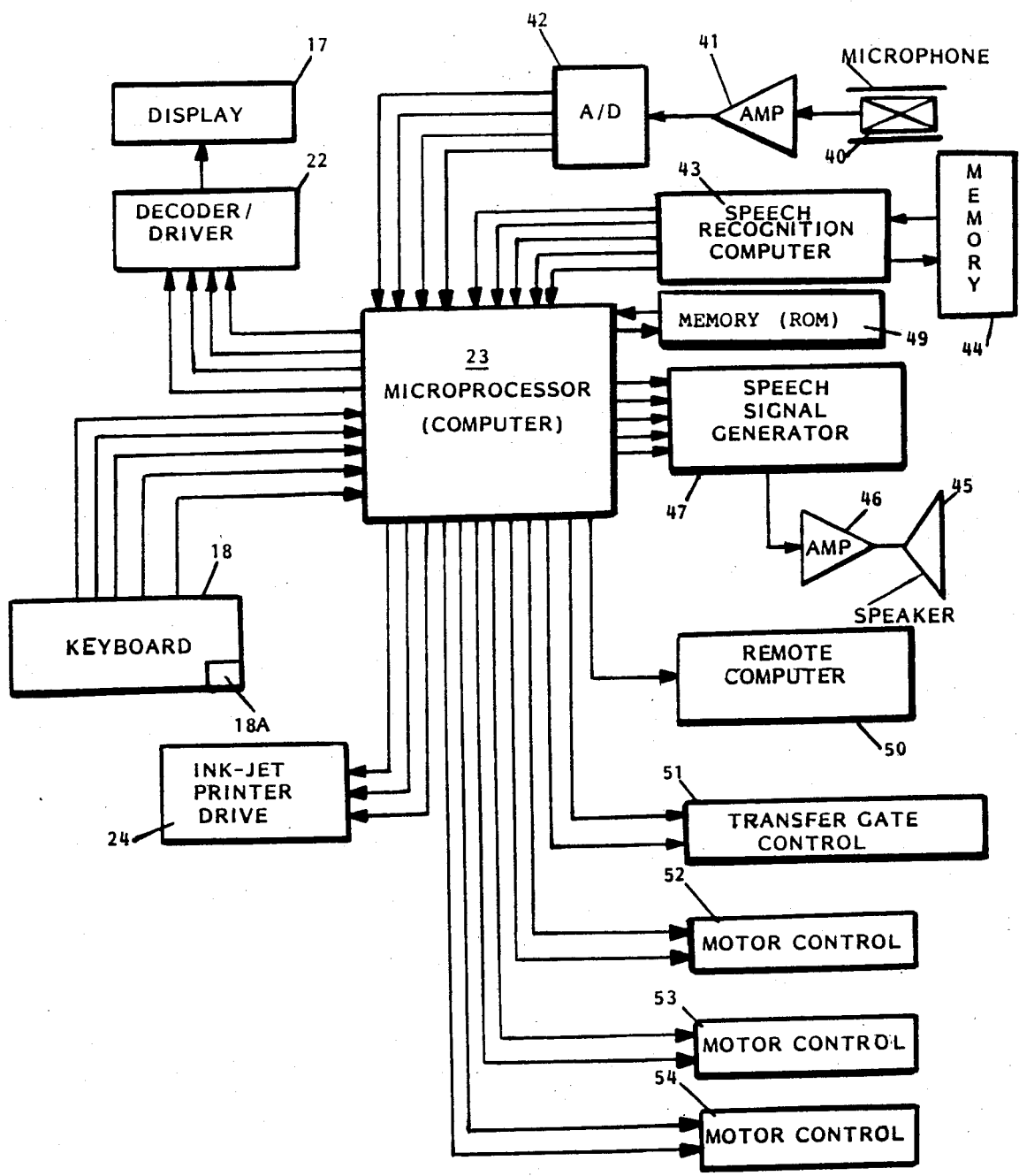
FIG. 2 is a schematic diagram of electrical and mechanical components and subsystems employed in the operation of the scale of FIG. 1.

There is shown in FIG. 1 a weighing and printing scale assembly 9 having a weighing platform 11 supported by a base 10 which includes a housing for certain weighing, weight indicating and electronic components to be described. The weighing platform 11 is conventionally supported for vertical movement, by means of a conventional spring mechanism 12 which is connected to the platform through a rack gear toothed bar 13, the teeth of which engage and rotate a spur gear 14 as the platform 11 moves downwardly when a weight is placed thereon and upwardly after the weight is removed. The spur gear 14 is connected to a rotary potentiometer 15 which is electrically connected to scale electronics of the type illustrated in FIG. 2 for indicating the weight of an article placed on the platform 11 by means of a numerical character display 17 supported by the vertical, rear extension of the housing defining the support 10 or main frame of the scale. Potentiometer 15 has a variable resistance which varies in accordance with the rotation of spur gear 14 as an indication of the displacement of the rack gear 13 and the weight of the article disposed on platform 11.

Supported within a cavity 16 in the platform 11 or supported by the top wall of the front portion of the housing 10H immediately below the platform 11, are one or more printing devices, such as an array of electrically operated printing wheels of the type shown in FIG.2, one or more ink jet character or code printers, an electrostatic or xerographic printing device, a laser or electron beam printer or other means or a label printer and applicator, which devices project their printing means, ink or label applying means upwardly through such cavity or recess 16 against the bottom surface of an article disposed thereacross on the upper surface of the platform 11, after the platform 11 has substantially come to rest with the container or article disposed thereon across the cavity 16.

Illustrated as supported in a subhousing adjacent the rear wall of the scale support 10 is a manual keyboard 18 which may be manually operated to enter variable data, such as cost of article weighed per pound, postal information such as destination, mileage or postal zone or other variable information. Such keyboard may also be disposed supported by either of the side walls of the housing or the front wall thereof or may be provided in a separate housing connected to the scale electronics by means of a suitable cable.

The control system illustrated in FIG. 2 includes scale electronics for computing information to be applied directly to the article disposed on the scale platform and for controlling the printing means therefor which is illustrated as an array of variably operable printing wheels 26, denoted 26A, 26B, 26C, etc. supported by a printing head 25 which is operable to be advanced and retracted through the opening 16 in the platform 11 by means of a bi-stable solenoid 31 supported by the platform or the main support 10 for the scale. As previously indicated, a suitable ink jet printing device containing a deflection controlled jet or jets of ink operable to provide dot-matrix characters as a line of such characters or a coded indicia against the bottom surface of the article disposed on the platform, may replace the printing wheel assembly or any other suitable printing means including a label printer and applicator may be used in its place.

The electronic control circuits illustrated in FIG. 2 are electrically operated by means of a power supply, such as a battery or transformer connected to a source of line current, the output of which is connected to properly energize all of the active circuits and components illustrated. Variable rotary potentiometer 15, which is connected to the shaft of spur gear 14, is operable to vary the frequency of a voltage controlled oscillator 20 but which may also comprise a single or dual slope integrator or other suitable means for converting changes in the electrical parameters of the variable potentiometer into a digital signal or signals.

The output of voltage controlled oscillator 20 is connected to a frequency counter circuit 21 which converts the signal received from the oscillator to a digital code representing the voltage controlled oscillator frequency, which is dependent upon the variation caused in the setting of the variable potentiometer 15 as determined by the weight of the article placed on the platform.

The coded output of the BCD frequency counter 21 is passed to a decoder-driver circuit 22 which converts the code and current levels to those necessary for the proper operation of display 17 which displays a representation of the weight of the article disposed on the platform 11. Although the circuits and displays may be operable to display any desired information derived at least in part from computation of the articles weight, such as price or postage, it is primarily employed to indicate the information which is actually printed by means of the printing device 25, on the surface of the article or may be operated to sequentially indicate different information or information resulting from selective operation of keys of the keyboard 18.

The output of the frequency counter 21 is also connected to a circuit 23, such as a microelectronic processor or computer plus memory, which may be employed to convert the codes received from the frequency counter to signals which are applicable to properly energize printer drive circuits forming part of an electronic chip 24 or portion of the computer or microprocessor 23. Such printer drive circuits 24 are operable to provide signals for controlling a motor or plurality of motors driving the print wheels 26A, 26B, 26C, etc. to properly position the printing cuts thereof for printing the proper weight or other information on the surface of the article. Similarly, the outputs of the drive circuits 24, may be employed to properly operate a single wheel printer or ink jet head as it moves in a line or direction across the surface of the article to print a line of characters or code thereon or to effect such printing with respect to a label which is applied thereafter to the article.

The printer 25 responds to codes received from computer 23 and/or those received from the key operated switches of the keyboard 18 or from computing circuits provided in the chip or circuit board of which computer 23 forms a part and operable to compute the information to be printed from the signals received from the variable potentiometer 15 when the scale 11 has come to rest and signals selectively generated by the keyboard 18 indicative of cost per unit weight, destination distance or a postal zone or other variable information. In other words, the system illustrated in FIG. 2 may be operable to print such variable information as (a) weight per se, (b) cost of article, (c) postage, (d) destination, (3) combinations of such information.

The signals applied to the printer drive circuit 24 or the computer 23 may also be derived from another device such as a remote computer or hand-held manual input code generator.

When an article is placed on platform 11, its weight causes a change in the voltage output of potentiometer 15 which in addition to that previously noted, causes a variable voltage signal to appar at capacitor 28, which is passed to an amplifier 29 which activates a timer circuit 30, such as a one-shot multi-vibrator which, after a suitable delay, supplies power to a solenoid 31 and when activated thereby, such solenoid advances the printer wheel assembly 25 after the printing wheels thereof have come to rest, through the cavity or opening 16 in the scale platform and causes the printing cuts of the wheels which are aligned for printing, to make contact with the bottom surface of the article or container which is disposed across such opening so as to print a requisite information on such bottom wall.

A timer 32, which may also comprise a one-shot multi-vibrator or other suitable means, is connected to the output of timer 30 so as to provide a signal for operating a manipulator, pusher device or conveyor for automatically removing the article from the scale platform after a suitable time delay sufficient to allow printer 25 to operate and retract from the surface of the article without smearing the printed information thereon.

As indicated above, if computer 23 contains a suitable computing circuit, keyboard 18 may be connected thereto to introduce variable data, such as postal or cost information, into the print computing circuit to properly energize the printer drive circuit 24 for effecting proper operation of the print wheels or other printing device to print desired information against the surface of the article or container aligned with the opening 16 in the scale platform 11.

Computer 23 and printer drive circuits 24 may be suitably modified for properly controlling the movement of a single print head, such as an ink jet printer, single printing wheel or printing ball across the opening 16 in a given direction to effect the printing of a plurality of indicia or characters representative of the information to be printed on the surface of the article disposed across the opening 16.

It is noted that the printing head 25 may also be disposed immediately adjacent the platform 11 supported by the scale housing and operable to advance against a side wall of an article disposed on the platform 11 to effect printing of the desired information thereon. In such arrangement, a stop or stops for predeterminately locating the container and retaining it on the upper surface of the platform during the printing operation, may be attached to the platform or the printing head may be properly controlled in its operation to engage and properly print characters on a side or top wall of the container disposed on the platform.

As shown in FIG. 2A a manually operated keyboard 18 for entering variable data into the microelectronic processor or computer 23 for controlling the printer 25 to print calculated results such as cost or postage on a record member or the article being weighed. The system system may also be provided with a microphone 40 and a speech recogition computer 43 for processing and analyzing the speech signals output by the microphone when select words of speech are spoken therein to provide command control signals for controlling such weight determined calculating and printing functions as described. The analog speech signals output by microphone 40 are amplified by an amplifier 41 and then digitized by an analog-to-digital converter 42 having parallel outputs extending to the computer 23 which output same in serial or parallel form to speech signal recognition computer 43. A memory in the form of a programmable random access memory 44 is connected to the computer 43 and provides digital speech signal recordings permitting the speech recognition computer 43 to recognize digitized speech signals it recieves of selected command words of speech spoken by an operator into microphone 40 and outputs codes defining recognition or command control signals which it passes to computer 23 for applying same to properly control the printer 25 to print the described postage or price information. In addition to applying the described weight and price information to the display driver 22, scuch information may also be intelligibly indicated as sounds of words of speech such as numbers defining such postage,price and weight on the output of a speaker 45 which receives synthetic speech signals from an amplifier 46 connected to the output of a synthetic speech signal generator-computer 47 which is controlled by signals received from the computer 23 derived from the price or postage computing circuits thereof and defining the same information applied to the display driver 22.

The speech recognition circuits 43 and the speech signal generating circuits or computer 47 may be formed on a single microelectronic integrated circuit chip such as the General Instruments SP-1000 computer chip which may be properly connected to input and output signals with respect to the microprocessor or computer 23 for the purposes described. All three circuits may be on a single microchip. The speech recognition computer 43 may also be operable to generate control signals for controlling other functions related to weighing, displaying weight, calculating postage,pricing or other information associated with the article or product weighed, printing and displaying such information relating to the weight and/or article weighed. Such control signals may be passed to the microprocessor or computer 23 which outputs the same signals or control signals derived therefrom to such devices as a start control 25C for the printer 25 to initiate the printing operation; a control circuit (not shown) located in the computer or microprocessor 23 for effecting the reading of one or more memories in such computer 23 to generate and transmit code signals defining the weight of the article weighed and other information such as date, time and product identification codes, to a local or remote memory or computer 50 where such information is recorded and used for record keeping and calculating purposes; etc. A signal or code generated when a select word or words of speech are spoken into microphone 40 may also be employed to cause the computer 23 to repeatedly activate the speech signal generating computer 47 to repeat its generation of the speech signals last generated for the operator to again listen to in the event he failed to properly hear the previously generated synthetic speech. Recognition of selected words of speech by the computer 43 may also be employed to generate control signals on its output for selectively controlling operation of the printer 24 to either print labels or directly apply selected characters or bar codes to the article weighed. Other functions controlled by signals generated when selected words of speech are recognized by computer 43 are product handling and/or other operations, such as packaging operations, performed with respect to the article weighed, the printing of routing and destination bar codes on the article weighed or its label, the printing or dispensing of proper postage and/or its application to the article, the printing of characters identifying the article weighed, the printing of the destination or address to which the article or container weighed is to be shipped and/or an address code defining such destination or the purchaser of the product; one or more bar codes and/or characters defining such additional data as routing information, inspection information,product code, time and date information,; machine readable codes useful in addressing a computer at point of purchase,etc. The command control signals generated by the speech recognition computer 43 when selected words of speech are recognized, may also be employed to effect or initiate such functions as starting and stopping a conveyor carrying articles to and from the scale, controlling the operation of one or more manipulators for handling such articles, repeating the weighing operation, repeating the results of weighing either as displayed, printed or generated as synthetic speech; recalculation of the price or postage; printing and application of labels to the article weighed; entering of the calculated data into a computer for record keeping and inventory purposes,etc.

Certain speech recognition computers include analog-to-digital signal conversion circuitry directly on a single microchip or as an auxilliary circuit on a separate chip.If such a chip is utilized, the output of the microphone amplifier 41 may be connected directly to speech recognition computer 43 or extend thereto through the computer or microprocessor 23.

The apparatus illustrated in FIGS. 2 & 2A may also be modified and employed in a semi-automatic container addressing or coding system with or without effecting weighing wherein characters or codes identifying products, defining address or routing information or other information are applied to individual products or containers in response to speaking select words into the microphone 40. Such system may employ the wheel printer 25 or an inkjet printer disposed adjacent a conveyor or conveyors, such as in FIG. 3, or may be used to print such data on labels and apply individual lables to products or continers automatically by means of a modified form of the apparatus shown in FIG. 4. Either or both the infeed and outgoing conveyors of such apparatus may be controlled to stop and start, slow down or speed up by an operator speaking the appropriate command words of speech into a microphone connected to the speech recognition computer which outputs and applies select command control signals for effecting the desired conveyor and printer control functions. If a motor operated gate or deflector for diverting articles from one conveyor to a selected of a plurality of branch conveyors extending from or parallel to the one conveyoris employed, it too may be selectively operated in response to control signal generated by the speech recognition computer 43 when an operator speaks selected words of speech into the microphone 43, which transfer may take place before or after weighing and printing or without such operation. Such speech controlled motor or acutator operated diverter may also be employed to shuttle or remove selected products or containers from a conveyor to a discharge chute or storage location adjacent the conveyor in response to the speaking of a select word of speech into the microphone.

In FIG. 2A keyboard 18 is provided with a key operated switch 18A which, when activeted, signals the computer or microprocessor 23 to control the speech signal generator to repeat the generation of the previously generated speech signals indicative of either the weight of the article weighed or the variable defined by the weight and variable entered either by the keyboard 18 and/or the speech regognition computer 43. The keyboard 18 may also be operated to selectively generate the described command control signals generated by the speech recognition computer 43 for controlling the described functions of printing, labling, transfer of data to the remote computer 50, effecting control of the transfer or article deflection gate 51, or the motors 52,53,54,etc. for controlling the described conveyors and article manipulator.

A pluggable memory 49, such as a ROM is also provided and contains message or control recordings which may be selectively reproduced therefrom by address signals generated by computer 43 when selected words of speech are spoken into microphone 40 or by signals generated by keyboard 24 or computer 50 wherein such signals are applied though the microprocessor or computer 23 to the drive 24 and/or the motor controls 52—52 for controlling the printer to print selected information such as alpha-numeric characters and/or bar codes defining such variables as addresses, routing instructions,catalog or product classification numbers, stock or lot number, inspection and quality control data, etc. on the article or to generate specific manipulator command control signals in accordance with the specific address signals generated.

In FIG. 3, a printing device 25 of the type shown in FIG. 2 or other suitable printing device of the type described, is provided as part of a conveyorized or otherwise automatic conveying system for articles defined at least in part by a plurality of conveyor belts 33A and 33B feeding articles to respective conveyor belts 34A and 34B which are aligned with the respective belts 33A and 33B a short distance therefrom between which is located the printing head 25. A common roller of 35, around which conveyor belts 34A and 34B are driven, is driven by a controlled constant speed motor 36 and such motor is controlled in its operation by the timer 32 illustrated in FIG. 2. Printer 25 is activated, as described, when motor 36 is stopped under the control of timer 32, and operates to advance its printing wheels into engagement with the bottom surface of the article disposed between conveyors 33 and 34, preferably during the interval the motor 36 is stopped in operation. The two belt system is employed to provide a space between the belts, across which space those portions of the articles on which printing is effected extend so that the printed material will not smear as the article is continued in its conveyance.

In FIG. 4 is shown an alternate form of the invention wherein labels 37 are conveyed by a roller or belt conveyor 38 to a printing location 39 at which location such labels are individually printed by means of a printer 25 of the type described and controlled as described. The printed label then proceeds along the conveyor to the vicinity of the article, wherein a vacuum operated manipulator head 40 engages the individual label disposed therebeneath, picks it up and carries it over an article A disposed immediately adjacent thereto on an auxiliary conveyor 41 to properly secure the label to the upper surface of the article after which the article is conveyed away from the label applying location and a second article is carried on conveyor 41 to such location. Timer 32 may be employed to control the operation of the conveyors 38 and 41 and the manipulator 40 for picking up and applying the label to the surface of the article while timer 30 illustrated in FIG. 2 may be employed to control the solenoid activating the print head 25 to print the desired information on the label disposed aligned therewith. The remaining controls illustrated in FIG. 2 are employed for controlling the operation of the printing device itself to properly print characters on the label.

It is noted that the scale weighing system may comprise a counter-balanced scale platform with the variable potentiometer 15 replaced by a conductive elastomer, the resistivity of which decreases proportionately with the degree it is compressed by movement of the scale platform thereagainst or an extension of the scale platform such as a piston or bar, so as to serve the same function as the variable potentiometer. In such case, the elastomer may also serve as the spring element, thereby eliminating such mechanical components as the spring 12, toothed rack 13 and pinion gear 14 as well as their supporting structures and mechanisms. Such an arrangement may be employed in an operating scale per se for activating an electronic display in accordance with weight imposed against and compressing the conductive elastomer.

In yet another embodiment of the invention, such a conductive elastomer may serve primarily as the variable resistance, with the spring return of the scale effected as the result of return of a mechanical metal spring or springs employed to counterbalance the platform to bias it to its zero or unweighed position, an an arrangement in which scale components are substantially simplified.

The voice signal recongnition computer 16 will be made in accordance with speech recognition devices and systems produced by such companies as Threshold Technology Inc. of Delrain, N.J; Dialog Systems, Inc., Belmont, Mass.; Scott Instruments, Denton, Tex.; Huristics, Inc., Sunnyvale, Calif.; and others. The message player unit or synthetic speech signal generator 17 may be derivable from or contain components manufactured by such companies as Texas Instruments Corp., Dallas, Tex. [using their TNC 0820 or other speech signal generating circuits]; Telesensory Systems, Inc., Palo Alto, Calif.; Vortax Division, Federal Screw Works, Troy, Mich.; Periphonics, Bohemis, N.Y.; Interstate Electronics, Inc. Anaheim, Calif. and others.

It should be understood with respect to the system 10 illustrated and described above, that power supplies having the correct polarities and magnitudes are provided, where not indicated in the drawings, so as to supply proper electrical energy for appropriately operating the various illustrated circuits as described in the specification and in a manner to properly perform the functions described.

A combined speech signal recognition computer and synthetic speech signal generating computer such as the SP-1000 manufactured by the General Instruments Corporation of New York; N.Y. may also be employed to perform the speech recognition and synthetic speech generating functions described herein.

Modified forms of the instant invention include the following:

1. The manipulator 40 of FIG. 4 may comprise an overhead track mounted manipulator or one which is on a floor supported base located adjacent the conveyor 38. It may be operable to handle either or both lables to be applied to articles weighed and the articles in movement onto and away from the weighing platform. Control of such manipulator may be effected in accordance with conventional article sensing and control signal generating means for programmed article manipulators.

2. The manipulator 40 may also be operable to handle and move articles weighed past automatic printing means such as an ink-jet printer located adjacent the weighing platform or one of the conveyors 38 or 41 and to handle such articles in a manner to permit the printer to properly print required indica on a select portion or protions of each article so handled.

3. The manipulator 40 may also be constructed and operable to permit articles handled thereby to be weighed while being handled by the manipulator by providing a strain gage or capacitance load sensor or sensors supported by one or more arms or the base of the manipulator operable to sense increase in load or weight caused by the article when it is picked up. The signals generated by such sensor(s) may be computer processed and analyzed as described above for generating the described command control signals for controlling the ink jet article or lable printer described above.

4. The article manipulator 40 may also contain an article printer, such as an ink jet printer which is carried by the manipulator past each article on the scale or conveyor and operated to print proper indicia on a select portion of each article.

5. An ink jet printer supported by the manipulator base or one of the arms of the manipulator and operated, as described, to print selected indicia, may be so operated as the article is carried by the manipulator head past the printer.

What is claimed is:

1. Weighing apparatus comprising:
   first means for sensing the weight of an article and generating an analog signal indicative of the weight sensed,
   second means for receiving, processing and analyzing said analog signal and generating first digital signals indicative of the weight sensed by said first means,
   third means including electrically operated indicating means for indicating a variable associated with the article sensed by said first means,
   a microphone,
   first electronic computing means connected to receive speech signals output by said microphone, process and analyze same and generate first control signals,
   second electronic computing means operable to receive said first digital signals and said first control signals and to perfrom a computing function with respect to the information defined by said signals and to generate second control signals defining information relating to computations involving said first digital weight defining signals and said first control signals generated by said first electronic computing means, and
   means for applying said second control signals to selectively control the operation of said electrically operated indicating means to cause said indicating means to indicate the information defined by said second control signals.

2. Weighing apparatus in accordance with claim 1 wherein said electrically operated indicating means includes a digital display means which is variably operable in response to the weight sensed by said first means and the information defined by said select words of speech spoken into said microphone.

3. Weighing apparatus in accordance with claim 1 wherein said electrically operated indicating means is operable to provide an intelligible indication of the cost of the product defined by the article weighed.

4. Weighing apparatus in accordance with claim 1 wherein said electrically operated indicating means is a printing means operable to print the information defined by said second control signals directly on a surface of the article weighed.

5. Weighing apparatus in accordance with claim 1 wherein said second electronic computing means is operable to compute postage based on the weight of the article weighed and the information defined by signals output by said first electronic computing means in response to select words of speech spoken into said microphone.

6. Weighing apparatus in accordance with claim 1 including memory means and means for recording information in said memory means defined by said second control signals.

7. Weighing apparatus in accordance with claim 1 including speech signal generating means controlled by said second electronic computing means for generating speech signals of words defining said computations performed by said second electronic computing means, and speaker means connected to said speech signal generating means for generating sounds of words of speech defined by the speech signals output by said speech signal generating means.

8. Weighing apparatus in accordance with claim 1 wherein said electrically operated indicating means is a printer which is operable to print the information defined by said second control signals.

9. Apparatus in accordance with claim 4 including a memory having a plurality of control messages recorded therein, means for applying selected of said first control signals generated when select speech is spoken into said microphone to address said memory to effect the reproduction of selected message signals from said memory and means for applying said selected message signals to control said printer to print select indicia on articles aligned with said printer.

10. A method of calculating and applying indicia defining computed information to articles comprising:
   (a) sensing the weight of an article and generating first information signals indicative of the article's weight,
   (b) speaking selected speech into a microphone and generating electrical speech signals on the output of said microphone,
   (c) computer processing and analyzing said speech signals and generating first control signals,
   (d) applying said first information signals and said first control signals to a first electronic computing means and operating said first electronic computing means to perform predetermined electronic computing functions with respect to the information defined by said signals and generating second control signals, and
   (e) applying said second control signals to control the operation of an intelligible information indicating means to indicate the information defined by said second control signals.

11. A method in accordance with claim 10 including operating said printing means to print indicia indicative of the weight of the article sensed.

12. A method in accordance with claim 10 including handling said article with a conveying means and controlling the operation of said conveying means with control signals generated by speaking select speech into said microphone, computer processing and recognizing the speech signals output by said microphone and generating control signals for controlling said conveying means.

13. A method in accordance with claim 10 wherein said intelligible information indicating means is a printing means, further including operating said printing means to print indicia defining the information calculated by said first electronic computing means in effecting said computing function.

14. A method in accordance with claim 13 wherein said printing means is operable to print said indicia directly on the surface of the article which is sensed.

15. Weighing apparatus comprising in combination:
   (a) first conveying means,
   (b) first control means for controlling the operation of said first conveying means,
   (c) second conveying means,
   (d) weighing means disposed between said first and said second conveying means and operable to receive and sense the weight of articles conveyed by said first conveying means,
   (e) a microphone accessible to a person controlling a weighing operation by said weighing means,
   (f) first computing means operable to receive speech signals of selected words of speech spoken into said microphone and to generate first command control signals in accordance with the words of speech spoken into said microphone by electrically processing and analyzing the speech signals output by said microphone,
   (g) means for selectively applying said control signals to said first control means to selectively control the operation of said first conveying means to permit an operator of said apparatus to properly control the conveyance of articles by said first conveying means to said weighing means and to permit said weighing means to properly weigh articles delivered by said first conveying means, and
   (h) means for transferring articles after they have been weighed to said second conveying means to permit said second conveying means to convey said articles away from said weighing means.

16. Weighing apparatus in accordance with claim 15 including second computing means responsive to selected speech signals output by said microphone computing a variable other than weight associated with the weight and information defined when select words of speech are spoken into said microphone.

17. Weighing apparatus in accordance with claim 15 wherein said weighing means comprises an article manipulator disposed between said first and second conveying means and operable to pick-up, weigh and transfer articles from said first to said second conveying means.

18. Weighing apparatus in accordance with claim 15 wherein said first conveying means includes an article manipulator operable to engage, pick up and transfer an article to said weighing means and to transfer articles from said weighing means to said second conveying means.

19. Weighing apparatus in accordance with claim 18 wherein said first conveying means includes an article conveyor operable to carry articles to said article manipulator.

20. Weighing apparatus in accordance with claim 18 including means for applying printed indications of weight to articles weighed by said weighing means, and means for controlling said article manipulator to predeterminately position each article with respect to said printing means to allow same to apply printing to a selected portion of each article weighed.

* * * * *